United States Patent [19]

Boehmer

[11] 4,181,310

[45] Jan. 1, 1980

[54] APPARATUS FOR ANALYZING THE MOVEMENT OF A DEVICE TO BE MANIPULATED

[76] Inventor: Noel A. Boehmer, 7760 Paseo Del Rey #101, Playa del Rey, Calif. 90291

[21] Appl. No.: 864,556

[22] Filed: Dec. 27, 1977

[51] Int. Cl.² ............................................. A63B 69/36
[52] U.S. Cl. ............................ 273/186 A; 273/191 B; 273/DIG. 21
[58] Field of Search ................... 35/29 A; 273/186 A, 273/191 B, 26 B, 29 A; 272/140

[56] References Cited

U.S. PATENT DOCUMENTS

| 434,771 | 8/1890 | Dowd | 272/140 |
|---|---|---|---|
| 1,137,349 | 4/1915 | Patterson | 273/191 B X |
| 3,806,131 | 4/1974 | Evans | 273/186 A |
| 3,876,212 | 4/1975 | Oppenheimer | 35/29 A |

Primary Examiner—George J. Marlo
Attorney, Agent, or Firm—Nilsson, Robbins, Dalgarn, Berliner, Carson & Wurst

[57] ABSTRACT

Apparatus for analyzing the movement of a device to be manipulated by a user thereof. In an embodiment, a unit that monitors movements in a device to be manipulated includes a flexible member which is attached to the device at a device associated position and which is extended and retracted with changes in distance, as measured along the member, between the associated position and another position through which the member passes; a motor-driven reel which provides additional lengths and takes up excess lengths of the member corresponding to the changes in distance; and a synchro which provides an electrical signal in response to the rotation of the shaft of the motor and of the reel. The output of the synchro is fed to an electronic data processor programmed for calculations dependent on the input from this unit and another such unit, and a recorder is provided to print a graphical display of the results of these calculations. In the embodiment, which is adapted to analyze a golf swing, the ends of the flexible members in the two units are attached to a golf club at an associated position which moves with the head of the club, and the members are slidably held to other positions so that portions of the members form a triangle. The configuration of the apparatus, including an adjustable initial configuration, leads to convenient equations for calculating significant positional variables in a golf swing, including the distance of the associated position from a reference plane defined by the vertices of the triangle in the initial configuration. The configuration and equations resulting therefrom are generally applicable to means for determining the distance of a position which moves with a device to be manipulated from a reference plane.

20 Claims, 6 Drawing Figures

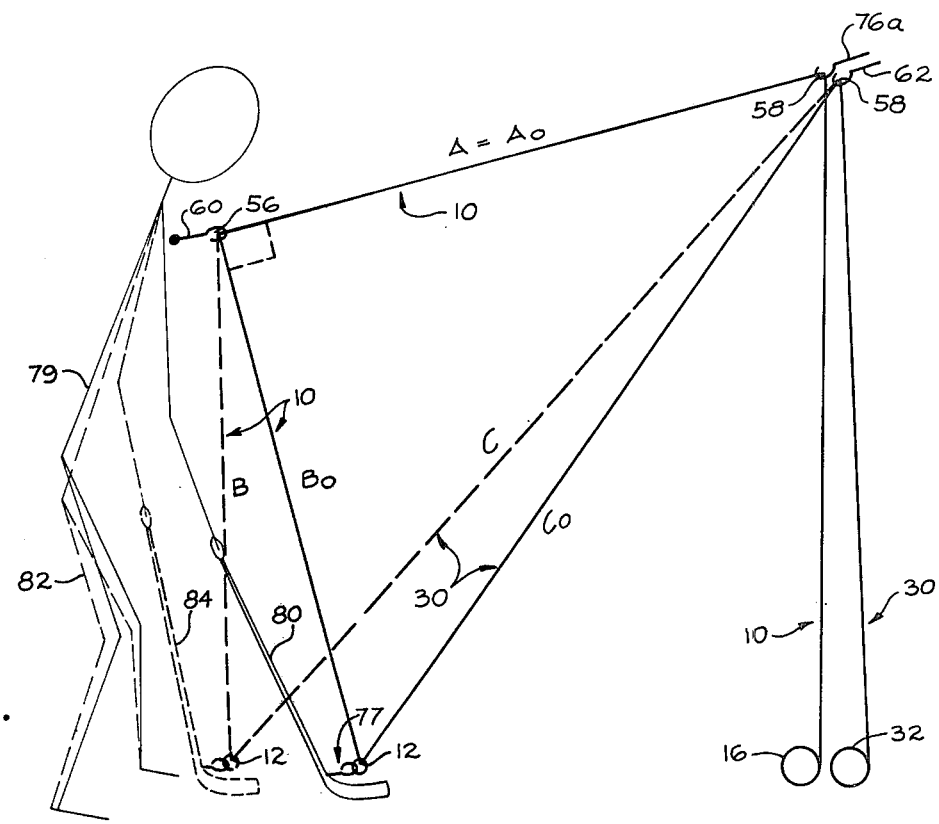
FIG. 4.
FIG. 3.
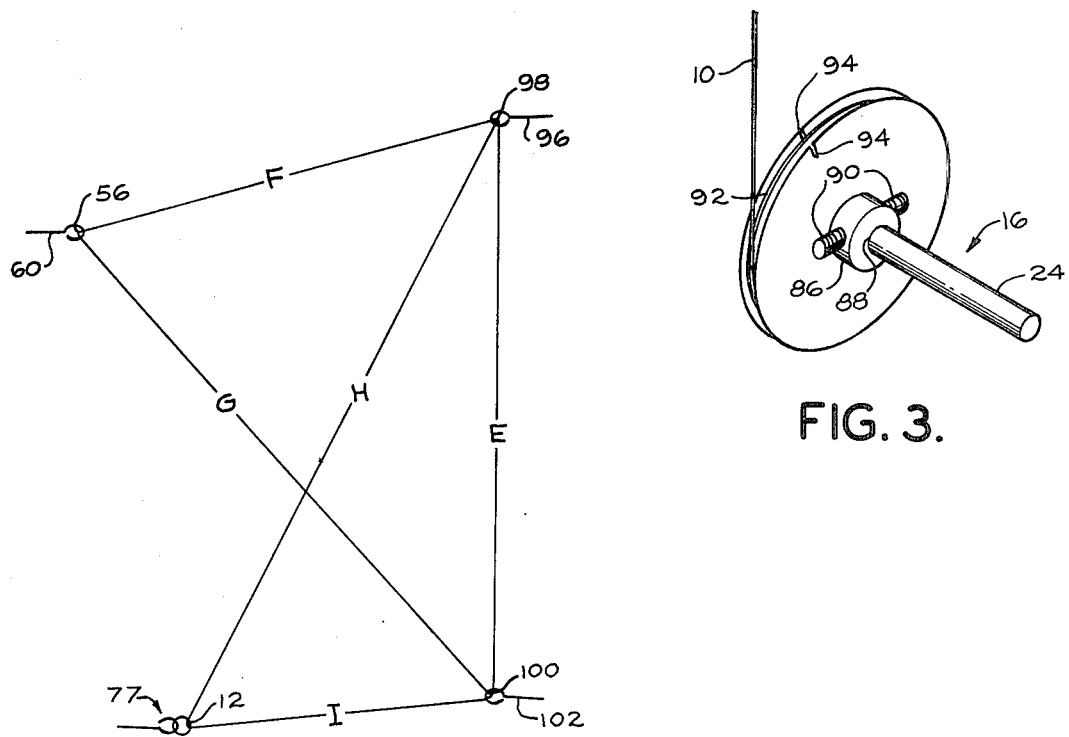
FIG. 5.

APPARATUS FOR ANALYZING THE MOVEMENT OF A DEVICE TO BE MANIPULATED

BACKGROUND AND SUMMARY OF THE INVENTION

This invention relates to apparatus for analyzing the movement of a device to be manipulated, such as a golf club or other athletic implement to be swung.

The aforementioned field, particularly where the apparatus may be used to analyze golf swings or other manipulations of athletic implements, has been of significant interest to inventors. The present invention includes a unit which monitors movements of a position associated with a device to be manipulated, geometrical configurations for the apparatus from which flow convenient equations for following significant positional variables, and the capability to display significant positional variables approximately simultaneously with changes in position.

Oppenheimer U.S. Pat. No. 3,876,212 discloses a system, including extensible and rotatable shafts connected to, e.g., a golf club to follow its movement; sensors, such as linear motion potentiometers, differential transformers and variable permanence transducers for providing signals in response to movements of the shafts; and electronic processing equipment for analyzing the movement of, e.g., the golf club.

Evans U.S. Pat. No. 3,806,131 inserts an accelerometer in a golf club head (to measure acceleration of the club head), a torque strain gauge in the club shaft (to measure torque about the shaft), a flex strain gauge in the shaft (to measure the flex of the shaft) and transmitters for the signals of these sensors in the shaft for input to a remote FM receiver and other signal processing and visual display equipment. The torque is viewed as an indicator of the orientation of the club head with respect to the shaft during the swing.

Hammond U.S. Pat. No. 3,945,646 similarly uses three accelerometers inserted in the club head and their measurements as indicators of whether and to what extent the club face is oriented properly during the swing. Acceleration perpendicular to the club face is viewed as desirable and indicative of orientation (at least at impact) perpendicular to the desired plane of flight. Hammond also includes a printer which displays electronically processed signals from the accelerometers.

Oppenheimer U.S. Pat. No. 3,595,583 employs spring-loaded reels (which may be tension-adjusted) to wind and unwind line as, e.g., a golf club attached to the line is swung. The reels are employed to train a user by, e.g., having him pull out a proper length of line and also to exert pressure to exercise the user's muscles.

Oppenheimer U.S. Pat. No. 3,917,281 discloses a cord secured to, e.g., a golf club head and to a fixed point, and also slidably attached to a member which slides on a circular track. It is used as a training device to improve the timing of a swing.

The significance that certain planes or that defining certain planes can play in a golf swing or swing with a variety of athletic implements and/or to evaluation of such swings is well recognized. Thus, Oppenheimer U.S. Pat. No. 3,595,583 discusses how various devices assumed that certain athletic swings with the hands, arms or implement should follow a uniplanar path but how a proper swing in fact often moves in constantly varying compound planes; and Marcella U.S. Pat. No. 3,341,208 discloses a golf guide which pivots in midswing to change the plane of the swing.

Butler U.S. Pat. No. 3,861,688 discloses an elastic member included in a signaling device for indicating proper or improper distance between positions which may be movable or stationary.

The present invention, in its aspects noted above and other respects, provides significant advances in the art.

In accordance with the invention, apparatus for analyzing the movement of a device to be manipulated by a user thereof, includes: a flexible member attached at one end and at a first position to the device for extending and retracting in a taut manner with changes in distance, as measured along the member, between the first position and a second position through which the member passes; means for extending additional lengths of the member corresponding to increases in the distance and retracting excess lengths of the member corresponding to decreases in the distance; and means for monitoring the extending of additional lengths and retracting of excess lengths. In accordance with more specific features of the invention, the means for extending and retracting includes a reel for providing the additional lengths and for taking up the excess lengths and, also, means for automatically rotating the reel to take up the excess lengths, which latter means includes a motor having a rotatable shaft to which the reel is connected; and the monitoring means provides an electrical signal in response to the changes in distance and includes a synchro which provides an electrical signal in response to the rotation of the shaft. In accordance with additional features of the invention, electronic data processing means are provided to generate an output electrical signal, corresponding to a sum of the changes in distance, in response to the electrical signal of the monitoring means; and means are included for providing a visual display in response to the output signal of the electronic data processing means.

In accordance with more extensive aspects of the invention, apparatus for analyzing the movement of a device to be manipulated, includes: a first flexible member attached at one end and at a first position to the device for extending and retracting in a taut manner with changes in distance, as measured along the member, between the first position and a second position through which the member passes; means for extending additional lengths of the first member corresponding to increases in the distance and retracting excess lengths of the member corresponding to decreases in the distance; a second flexible member attached at one end and at a first position to the device for extending and retracting in a taut manner with changes in distance, as measured along the member, between the first position and a third position through which the member passes; means for extending additional lengths of the second member corresponding to increases in the distance for the second member and retracting excess lengths of the member corresponding to decreases in the distance; and means for slidably holding the first member to a fourth position intermediate, as measured along the member, the first and second positions.

In an embodiment, the aforementioned holding means secures the first member to the user of the device, and an additional holding means is provided for slidably holding both the first and second members to a fifth position which may be adjustably varied. The fifth position is intermediate, as measured along the first member, the aforementioned fourth and second positions and intermediate, as measured along the second member, the aforementioned first and third positions. The portions of the first and second members between the aforementioned first, fourth and fifth positions are disposed in a triangular configuration which, with the device oriented in an initial position prior to manipulation, is a right triangle satisfying the Pythagorean Theorem. This configuration of the flexible members, along with certain requirements, or assumptions, regarding the lack of movement of the fourth and fifth positions, leads to favorable equations for solving for significant positional variables, including the distance of the first position from a reference plane defined by the first, fourth and fifth positions with the device oriented in the aforementioned initial position. Means for monitoring the extending of additional lengths and retracting of excess lengths of the first flexible member and means for monitoring the extending of additional lengths and retracting of excess lengths of the second flexible member, in effect, monitor the changes in the variables in these equations and provide signals to which an electronic data processing means responds in solving the equations, which solutions take the form of signals to which a means for providing a visual display responds.

In accordance with more general features of the invention, the apparatus provides means for determining the distance of a first position which moves with a device to be manipulated by a user thereof from a reference plane and if said position is on one side or the other side of said plane. The plane is defined by the characteristic that a first line through an initial location of the first position and a second stationary position lies in the plane and a second line perpendicular to the first line through the second position is perpendicular to the plane. The apparatus includes means for determining, for locations of the first position, the distances between the first and second positions and between the first position and a third stationary position on the second line; and means for solving, for locations of the first position, an equation which is dependent upon the distances between the aforementioned positions.

BRIEF DESCRIPTION OF THE DRAWINGS

FIG. 3 is a perspective view of a reel which is incorporated into the apparatus of FIG. 1.

FIG. 4 is a diagrammatic illustration of the geometry of FIG. 1 and of moved geometry for the apparatus of FIG. 1.

FIG. 5 is a diagrammatic illustration of the geometry of an initialization procedure for apparatus in accordance with FIG. 1.

DETAILED DESCRIPTION

The apparatus described herein is particularly adapted to the analysis of a golf swing. However, it will be evident that the apparatus and other apparatus in accordance with the invention may be more generally applied not only to the analysis of swings used with other athletic implements, but to the analysis of movements of a device to be manipulated. For example, the apparatus of FIG. 1 embodies means for determining the distance of a position which moves with a golf club from a reference plane, but more generally, also embodies means for determining the distance of a position which moves with a device to be manipulated from a reference plane.

Also, in the description of the apparatus of FIG. 1 in the context of the analysis of a golf swing, it is indicated that it has been generally found and that it is assumed that a certain "user associated" position, described in more detail below, remains approximately stationary in an initial location of the position during part of the course of a conventional golf swing. Those familiar with the sport of golf will, of course, recognize that there is some movement in the position from the nature of the position.

Figure 1:
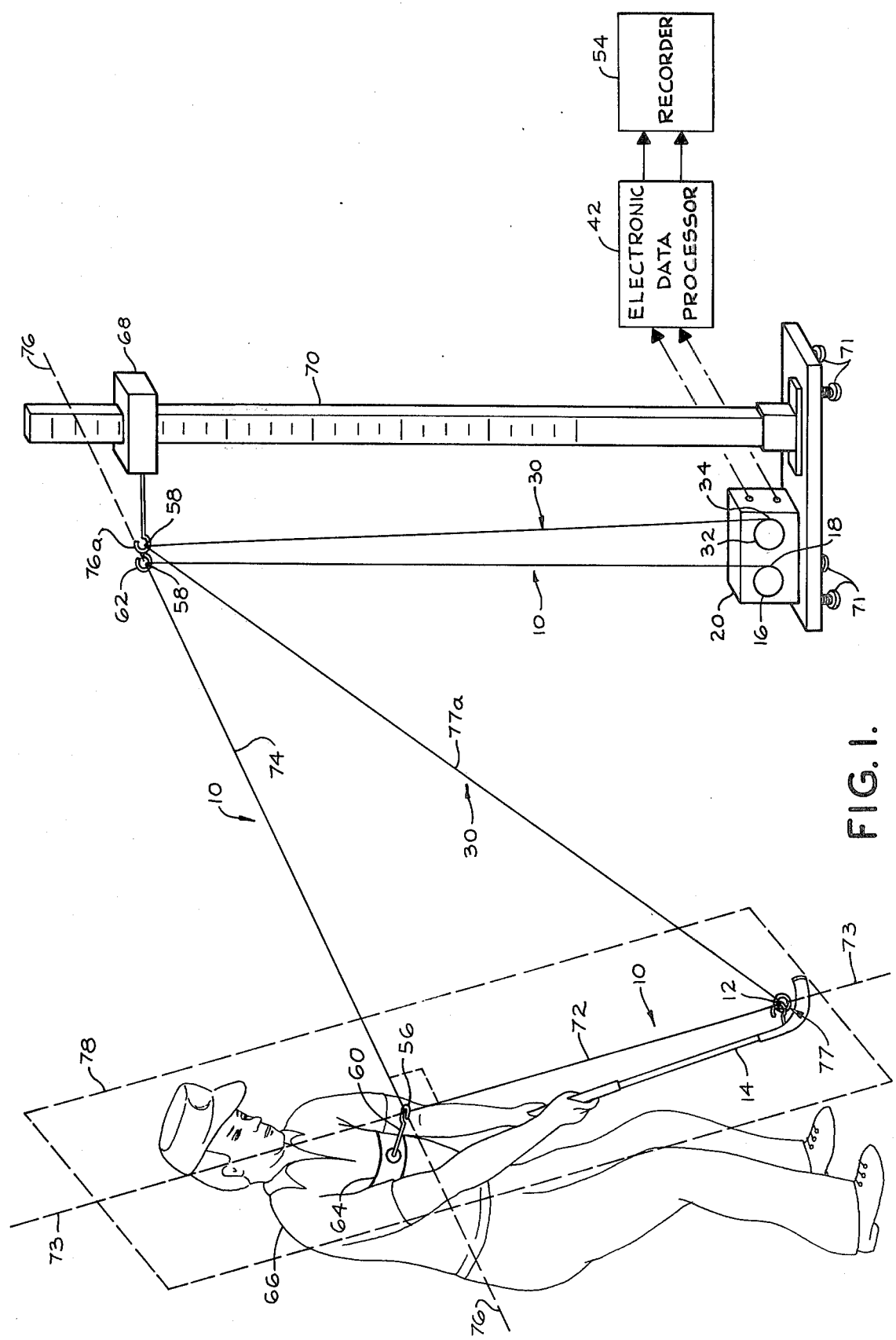
FIG. 1 is a diagrammatic view of apparatus in accordance with the invention applied to the analysis of a golf swing.
Figure 2:
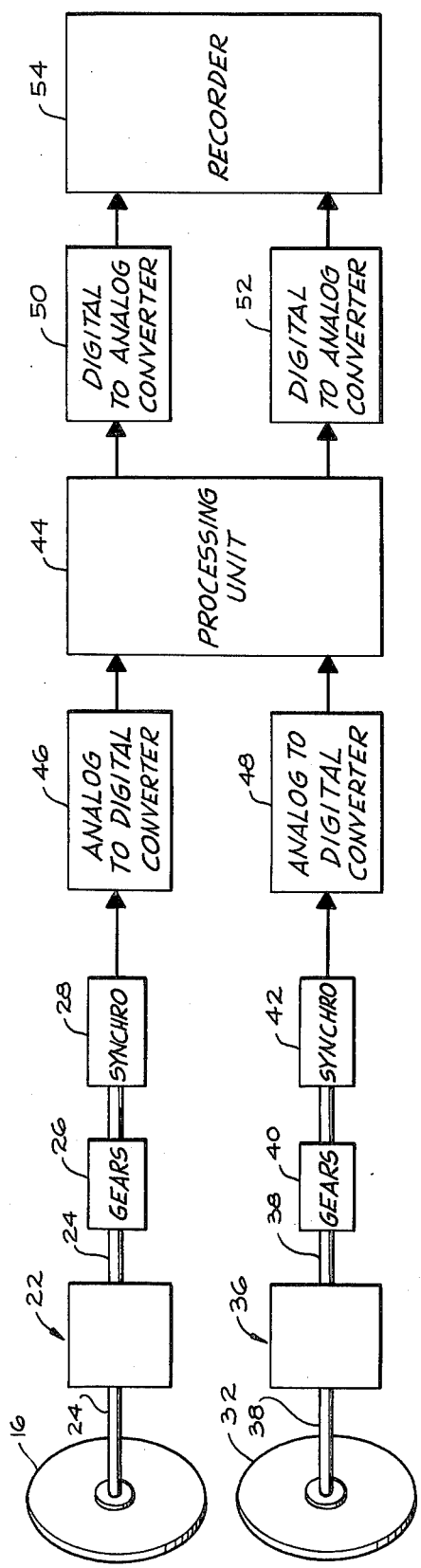
FIG. 2 is a diagrammatic view showing the drive-monitoring units and electronic data processor which are incorporated into the apparatus of FIG. 1.

Referring generally to FIG. 1, the apparatus includes a first flexible member 10 firmly attached at one end and at a club associated position 12 to a golf club 14 which is to be swung. The member 10 is also wound around a first reel 16 from which the member extends. The member 10 is substantially inelastic; and it extends from around the reel 16 and retracts around the reel, in a taut manner, with changes in distance between the club associated position and a first reel associated position 18. This first reel associated position 18 is the position at which the portion of the first flexible member 10 extending from the reel 16 intersects the portion of the member which is wound around the reel. Hidden by a chassis 20 and the reel 16 in FIG. 1, but shown in FIG. 2 is a drive-monitoring unit for the first flexible member 10. The unit includes a motor 22 having a double-ended shaft 24 to which the reel 16 is fixedly connected on one side and a set of gears 26, connected to the other side of the shaft, which drive a first synchro 28 as the shaft rotates. The motor 22 automatically rotates the reel 16 to retract excess lengths of the flexible member 10 as they are created, and the synchro provides an electrical output signal corresponding to the extending and retracting of the lengths of the flexible member 10. When additional lengths of the member 10 are required, they are unwound from the reel against the force of the motor 22.

Returning to FIG. 1, there is also included a second substantially inelastic flexible member 30 attached at one end and at substantially the same club associated position 12 to the golf club 14 and wound around and extending from a second reel 32. In a manner analogous to that described for the first flexible member 10, the second flexible member 30 extends and retracts, in a taut manner, with changes in distance, as measured along the member, between the club associated position 12 and a second reel associated position 34, defined in a manner analogous to the first reel position 18. Referring to FIG. 2, a drive-monitoring unit for the second flexible member 30 includes a second motor 36 having a double-ended shaft 38, a second set of gears 40 and a second synchro 42, which have the same characteristics as the comparable elements in the drive-monitoring unit for the first flexible member.

An electronic data processor 42 shown in FIG. 1 includes a processing unit 44 (FIG. 2) programmed to generate certain output electrical signals in response to the electrical signals generated by the synchros 28 and 42. First and second analog to digital converters 46 and 48 convert the analog outputs of the first and second synchros 28 and 42 to digital signals for processing by the digital processing unit 44. Output digital signals generated by the processing unit 44 are converted to analog signals by first and second digital to analog converters 50 and 52, the outputs of which are printed as graphical displays by a recorder 54, such as a strip-chart recorder. All four converters are included in the electronic data processer 42 of FIG. 1.

The first flexible member 10 in FIG. 1 is held to two positions intermediate, as measured along the member, the club associated position 12 and the first reel associated position 18. One of these is a user associated position 56 and the other is a support associated position 58. The member is slidably held to these intermediate positions by a user associated hook connector 60 and a support associated hook connector 62, respectively. The flexible member can slide through the connectors while being held to the user associated position 56 and support associated position 58. The user associated hook connector 60 is attached to a belt 64 which is secured about the torso of the user 66 of the golf club 14.

In FIG. 1, the user 66 is in his initial, address position, and the club 14 is oriented in an initial position, prior to manipulation of the club. It has been generally found and it is assumed that during the course of a manipulation of a golf club by a user thereof in a conventional golf swing, that the user associated position 56 remains approximately stationary in its initial, address location until the user is well into the follow-through of the golf swing. For the apparatus of FIG. 1, applied to the analysis of a golf club swing in the manner shown by FIG. 1, the movement of the club that is to be analyzed encompasses the movement of the club from its initial, address orientation (or position) until the point (in general well into the follow-through) at which the user associated position 56 no longer remains approximately stationary.

The support associated position 58 remains stationary, as the support associated hook connector 62 is fixedly secured to an adjusting element 68. The adjusting element may be moved up or down a standard 70 which contains a scale for indicating the vertical position of the support associated position 58. (Four levelling screws 71 and a two-axis bubble (not shown) provide additional adjusting capabilities.) As shown in FIG. 1, with the golf club 14 in its initial orientation (or position), prior to the swinging of the club, the support associated position 58 is adjusted so that the portion 72 of the first flexible member 10 between the club associated position 12 and user associated position 56 is oriented along a first line 73 and the portion 74 of the first flexible member between the user associated position and support associated position is oriented along a second line 76, which lines are mutually perpendicular. As will become clear below, these orientations, along with other factors, lead to convenient equations for significant positional variables associated with the golf swing.

In a manner similar to that described for the first flexible member 10, the second flexible member 30 is slidably held to substantially the same support associated position 58 by a second support associated hook connector 76a disposed in substantially the same position as the first support associated hook connector 62. A club associated combination hook and ring connector 77 (attached to the club 14), which is used to attach the flexible members 10 and 30 to the club at substantially the same club associated position 12, is somewhat similar to the other aforementioned hook connectors. However, the members 10 and 30 are attached at the club associated position 12 so that the members extend and retract with movements in the position. Thus the ends of the members at the club associated position move with the club 14 and club associated position 12.

A variety of well-known means, other than those specifically illustrated, could be employed for attaching the members to the club at a club associated position and for holding the members to a user associated position or support associated position. For example, a connector having a single ring or having a single hole, for the two members, could be employed to achieve substantially the same support associated position for the two members. Similarly, a variety of well-known means could be employed to provide the capability to adjustably vary the support associated position.

It was indicated above that the first flexible member 10 extends and retracts with changes in distance, as measured along the member, between the club associated position 12 and the first reel associated position 18. This first reel associated position 18 remains substantially stationary in that its movement is essentially only due to changes in the radius at which it is located, as a result of the winding and unwinding of the flexible member 10. Thus, with the support associated position 58 stationary, and while the user associated position 56 is approximately stationary, the first flexible member 10 essentially extends and retracts with changes in distance, as measured along the member, between the club associated position 12 and the user associated position 56. In fact it essentially extends and retracts with changes in distance between the club associated position and all positions along the first flexible member 10 between and including the user associated position 56 and the first reel associated position 18. In a similar fashion, the second flexible member 30 essentially extends and retracts with changes in distance, as measured along the member, between the club associated position 12 and the support associated position 58. Similarly, it in fact essentially extends and retracts with changes in distance between the club associated position and all positions along the second flexible member between and including the support associated position 58 and the second reel associated position 34.

A number of facts become evident upon an analysis of the configuration of FIG. 1. First, with the club 14 in its initial, address orientation (or position) (as in FIG. 1), and also as the club is swung (see FIG. 4), the club associated position 12, the body associated position 56, and the support associated position 58 constitute the vertices of a triangle, having as a first leg the portion 74 of the first flexible member 10 between the body associated position and the support associated position, as a second leg the portion 72 of the first flexible member between the user associated position and the club associated position, and as a third leg the portion 77a of the second flexible member 30 between the club associated position and the support associated position. In addition, with the club 14 in its initial, address orientation (as in FIG. 1), the aforementioned triangle is a right triangle. Thus, if the lengths, for the initial, address orientation of the club, of the first, second and third legs are represented by $A_O$, $B_O$ and $C_O$, respectively, the following equation is satisfied:

$$C_O^2 = A_O^2 + B_O^2.$$

Secondly, for the initial, address orientation, the first and second legs of the triangle define a reference plane 78 characterized in that the first leg (the portion 74 of the first flexible member 10 between the user associated position 56 and support associated position 58) is perpendicular to said plane and the second leg (the portion 72 of the first flexible member 10 between the user associated position 56 and the club associated position 12) lies along said plane. Stated another way, the reference plane may be characterized in that a line through the club associated position 12 and the user associated position 56 (i.e., the line 73 along which the second leg is oriented) lies along the plane and a line through the user associated position 56 and the support associated position 58 (i.e., the line 76 along which the first leg is oriented) is perpendicular to the plane.

Thirdly, during a portion of the course of manipulation of the club during which the user associated position 56 remains approximately stationary at its location with the club oriented in its initial, address position prior to manipulation, the following equations are approximately satisfied:

$$X = (A_O^2 + B^2 - C^2)/2A_O,$$

and $$B - B_O = B - B_O + A - A_O;$$

where the magnitude of X equals the distance of the club associated position from the reference plane described above and X is negative if the club associated position is on the user side of the plane and positive if the club associated position is on the other side of the plane, $A_O$, $B_O$ and $C_O$ are as defined above, A = the length of the first leg of the triangle described above, B = the length of the second leg of the triangle described above, and C = the length of the third leg of the triangle described above.

Of course, the second equation is another way of stating that $A = A_O$, which is satisfied if the body associated position remains stationary.

By reference to FIG. 4 along with FIG. 1, the significance of the quantities X and $B - B_O$ may be appreciated. FIG. 4 shows a user address orientation 79 and club address orientation 80 (as in FIG. 1) and a user orientation 82 and club orientation 84 during the course of a swing (in phantom). The user associated position 56 is at its address location for both sets of orientations. FIG. 4 also illustrates, for the address orientations, the length $A_O$ of the first leg, $B_O$ of the second leg, and $C_O$ of the third leg, of the aforementioned triangle, along with, for the moved orientations, the length A of first leg, B of the second leg and C of the third leg, of the triangle (second and third legs in phantom.) In FIG. 4, it is indicated that the lengths of the first leg of the triangle for the initial (address) and moved orientations are equal.

From these figures, it becomes evident that $B - B_O$ corresponds to the change in distance between a position which moves with the golf club and which represents (at contact) a golf ball, and a position in the mid-chest region of the golfer. For a properly chosen mid-chest position, the change in this distance during a golf swing is a variable which is of significant interest to a golfer in analyzing his swing. Similarly, for a proper initial location of the mid-chest position, X corresponds to the distance of the position that moves with the club from a plane characterized in that the plane passes through a location representing a golf ball and, approximately, the initial locations of the shoulders of the golfer. (X of course also indicates, by its sign, on which side of the plane the position that moves with the club is disposed.) Such a plane will generally approximate the desired plane of flight of the golf ball. Furthermore, a golf swing should in general be such that the position that moves with the club remains in or on the user side of such a plane until well into the follow-through of the swing. This is one reason why the variable X is of significant interest to a golfer in analyzing his swing. The variation in X also is of interest in that it permits the golfer to generally analyze what happens during the course of his swing in terms which are both useful and understandable.

It will be evident to those generally familiar with a number of sports in which an implement is swung, that swings in such sports often have the equivalent of the reference plane 78 and the equivalents of what the quantities $B - B_O$ and X represent in terms of a golf swing. Examples are a baseball swing and a tennis serve.

Although the operation of the drive-monitoring units, electronic data processor and recorder will be described in more detail below, from the prior discussion of their operation, it can be appreciated in a general way how they operate in the context of the apparatus. It was indicated above that the first flexible member 10 is extended from and retracted around the first reel 16 with changes in distance, as measured along the member, between the club associated position 12 and the first reel associated position 18. It was also indicated that while the user associated position 56 remains approximately stationary, the member essentially extends and retracts with changes in distance between the club associated position and the user associated position. It was additionally indicated above that the first synchro 28 monitors the extending and retracting of lengths of the first flexible member 10 with changes in the aforesaid distance. The synchro in fact provides an electrical signal which varies with the position of a mechanical member in the synchro which moves with the rotation of the shaft 24 of the motor 22. (The functions of the synchro and its associated analog to digital converter could, thus, readily be performed by other well-known means, for example, a shaft encoder (shaft to digital converter).) Since the shaft 24 also rotates with the extending of the flexible member 10 from the reel 16 and retracting of the member around the reel, changes in the position of the mechanical member in the synchro correspond to rotations of the reel 16 and extensions and retractions of the member 10. It thus becomes evident that if the radius from which the member 10 is being extended or retracted is taken into account, that the synchro 28 in fact provides an electrical signal which corresponds to changes in distance, as measured along the first flexible member 10, between the club associated position 12 and the first reel associated position 18 (or, essentially, between the club associated position and the user associated position 56, while the latter position remains approximately stationary). In a similar manner, the second synchro 42 provides an electrical signal which corresponds to changes in distance along the second flexible member 30 between the club associated position 12 and the second reel associated position 34 (or, essentially, between the club associated position and the support associated position 58, which latter position in fact remains stationary).

It thus becomes evident that if the electronic data processor 42 is provided with the initial conditions: $A_O'=A_O$, $B_O'=B_O$, and $C_O'=C_O$, where $A_O$, $B_O$ and $C_O$ are initial lengths as defined above, and if the electronic data processor is also provided with necessary dimensional information relating to the reels and flexible members, that from the electrical signals of the synchros 28 and 42, the electronic data processor 42 can be programmed to generate output electrical signals corresponding to the solutions for $X'$ and $Y$ in the following equations:

$$X'=[A_O'^2+(B_O'+L_1-L_{10})^2-(C_O'+L_2-L_{20})^2]/2A_O',$$

and $$Y=L_1-L_{10};$$

where $L_1$ = the length of the portion of the first flexible member 10 between the club associated position 12 and the first reel associated position 18 (alternatively, with the user associated position 56 approximately stationary, essentially also between the club associated position and the user associated position), $L_{10}$ = the initial length, with the golf club 14 in its initial orientation (or position) of said portion of said first flexible member between said positions, $L_2$ = the length of the portion of the second flexible member 30 between the club associated position 12 and the second reel associated position 34 (alternatively, essentially also between the club associated position and the support associated position 58), and $L_{20}$ = the initial length, with the golf club 14 in its initial orientation (or position), of said portion of said second flexible member between said positions.

Of course, during the course of a portion of the golf swing in which the user associated position 56 remains approximately stationary in its initial location, $X'$ essentially (or approximately) corresponds to the solution for $X$, and $Y'$ essentially (or approximately) corresponds to the solution for $B-B_O$, as defined above.

The electronic data processor 42 is in fact programmed to provide the electrical output signals corresponding to the solutions for $X'$ and $Y$ in the above equations. These signals are received by the recorder 54 which prints a graphical display of $X'$ and $Y$ approximately simultaneously with the changes in distance which are monitored by the synchros 28 and 42, i.e., with the swinging of the golf club. An oscilloscope is one of a variety of other well-known means which, alternatively, may be employed to provide a graphical display of $X'$ and $Y$.

With the overall operation of the apparatus of FIG. 1 in mind, certain more detailed design considerations are better appreciated. The flexible members 10 and 30 should of course be generally inelastic so that changes in distance, along the members, which are to be measured, correspond to lengths of the members which are extended from and retracted from the reels 16 and 32. Also, the members should have a cross-section which holds to a relative minimum changes in the radial locations of the first and second associated reel positions 18 and 34, as the members are wound and unwound. The members must also have sufficient strength to withstand the forces to which they are subject. A monofilament line member having a diameter equal to 5 mils is one type of flexible member which has performed satisfactorily.

The reels 16 and 32, of course, must interact in a satisfactory manner with the flexible members 10 and 30. Additionally, it is desirable that these reels present a relatively minimal inertia to the shafts 24 and 38 of the motors 22 and 36. This minimal inertia eases the requirements for the motors in that it makes it easier for the motors to maintain the members in a taut condition. This is significant in that the changes in distance, as measured by the appartus, become inaccurate if slack develops along the members.

The first reel 16 is shown in position in FIG. 3. The reel is made of a low density plastic, such as plexiglass, and has a hub 86 having a cavity 88 into which one end of the shaft 24 is inserted and in which the shaft is held by two set screws 90. The reel defines an annular channel 92 which, for use with the above-described monofilament line member may conveniently be 20 mils wide and 90 mils deep. A slot 94, also defined by the reel is used for retaining the member through insertion in the slot of a knot in the line. (The second reel 32, of course, has the same design as the first.)

The first set of gears 26 (FIG. 2) are used to reduce the angular acceleration of the mechanical member in the first synchro 28, which moves with the rotation of the shaft 24, to a value which is satisfactory for interface with the first analog to digital converter 46. At the same time, the gears are designed (including choice of gear ratios) to hold to a relative minimum the inertia reflected to the motor 22. (This of course also applies to the second set of gears 40, the second motor 36, the second synchro 42 and the second analog to digital converter 48).

A wide variety of readily available motors may be employed in the apparatus of FIG. 1, including AC and DC motors. In general, a motor which will maintain the members in a taut condition and requires a force of about 2 ounces or less on the flexible member to overcome the motor's stall torque (e.g., has a stall torque of about 1.5 inch-ounces which must be overcome by a force on a flexible member extending from a reel at a radius in the vicinity of 0.85 inch) should be satisfactory.

On a related matter, it was found that with the above-described monofilament line member employed as the flexible member and with the line member extending from the reel at a radius averaging in the vicinity of 0.85 inch, it was unnecessary to consider the change in radius of the reel associated positions, as the reel wound and unwound line, in the calculations undertaken by the electronic data processor during a swing of the golf club. On the other hand, the change in radius should generally be considered in using the apparatus to determine the initial conditions used by the processor. An automatic initialization procedure for determining these initial conditions is described later.

The processing unit 44 (FIG. 2) can be conveniently programmed to ground its calculations of $X'$ and $Y$ above in the changes in length which are measured by the apparatus. Thus the solutions for $X'$ and $Y$ can be written as integrals over the changes in length, as measured by the system, which integrals can be approximated by the following equations:

$$X_n' = A_O^{-1} \left\{ \sum_{i=1}^{n} (B_O + L_1 - L_{10})_i [\Delta(L_1 - L_{10})_i] - [\Delta(L_1 - L_{10})_i]^2/2 - \sum_{i=1}^{n} (C_O + L_2 - L_{20})_i [\Delta(L_2 - L_{20})_i] - [\Delta(L_2 - L_{20})_i]^2/2 \right\} Y_n = \sum_{i=1}^{n} \Delta(L_1 - L_{10})_i;$$

where n is an integer representing the number of the sampling increment and $\Delta(\Delta)_i$ represents the change between the ith and (i−1)st sampling increments.

The apparatus of FIG. 1 including the analog to digital and digital to analog converters, has functioned satisfactorily using $\Delta$ increments of about 0.19 inch at the input of the processing unit 44. At the input of the recorder, the same increments with ranges of about plus or minus 24 inches, in conjunction with an 0.38 inch increment, plus or minus 48 inch option for X', has proven generally satisfactory.

Also, with respect to the above equations, the apparatus of FIG. 1 applied to a golf swing has operated in a satisfactory manner with the term in the largest brackets (i.e., everything but $A_O^{-1}$) being updated approximately once every 350 microseconds. The 350 microsecond interval has been found to prevent changes of greater than plus or minus one increment in variables in the brackets (thus also in Y) between updates. With the 350 microsecond update rate and a multiplication by one digital bit of $A_O^{-1}$ also carried out approximately once every 350 microseconds (a value of the term in the largest brackets having been stored for accomplishing the complete multiplication), the apparatus has been adapted to provide a solution for X' approximately once every 5 milliseconds (or about 200 solutions per second).

A number of significant characteristics of the apparatus which generally follow from aspects which have been described may be summarized. First of all, there need be no temporary storage by the electronic data processor of monitoring data (i.e., the processing unit need have no memory for the temporary storage of data). Also, and somewhat related to this, the output displayed by the recorder can be displayed approximately simultaneously with the changes in length (distance) which are measured by the apparatus. Thus the apparatus can function as a "real time" system. Also, what may be considered relatively slow response characteristics of mechanical aspects of the apparatus are sufficiently fast, in the case of a golf swing, at least in part because of the geometry of the swing. A feeling for this can be garnered from considering, for example, that although the club head will generally be moving at its greatest rate near the point of impact with a golf ball, the changes in distance between the club associated position 12 and the reference plane 78 (FIG. 1) should be relatively small along the path of the position 12 near the point of impact.

It was indicated above that an automatic initialization procedure has been developed to provide the initial conditions $A_O$, $B_O$ and $C_O$ used in solving for X'. This procedure is geometrically illustrated in FIG. 5.

Referring to this procedure, as illustrated in FIG. 5, the first flexible member 10 and the second flexible member 30 are each unwound from their reels and run through a support associated eyelet connector 96 so that they are held to substantially the same support associated eyelet position 98, and from there to substantially the same base associated eyelet position 100 at a base associated eyelet connector 102. These eyelet positions are vertically aligned with the eventual location of the support associated position 58 (FIG. 1). The electronic data processor then determines the length of each member that has been extended. Following this, the first member is disengaged from the base associated eyelet position and run to the user associated position 56. From the original extended length of the member, the change in its extended length and the known distance E between the support associated eyelet position 98 and base associated eyelet position 100, the distance F between the support associated eyelet position 98 and user associated position 56 can be determined by the data processor. The distance G between the base associated eyelet position 100 and user associated position 56 may be similarly determined following an extension of the second member from the base associated eyelet position to the user associated position. The coordinates of the user associated position 56 with respect to the base associated eyelet position are then calculated by the data processor. The distances H between the support associated eyelet position 98 and club associated position 12 and I between the base associated eyelet position 100 and club associated posiion, and the coordinates of the club associated position with respect to the base associated eyelet position can be determined in an analogous fashion. These determinations require the disengagement of the first and second flexible members from the user associated position and their engagement at the club associated position. From the above information, the data processor calculates what the required vertical setting for the support associated position 58 (FIG. 1) will be to achieve the desired initial right triangular orientation of the apparatus and what $A_O$ (and $A_O^{-1}$), $B_O$ and $C_O$ will be. As indicated previously, changes in the radii at which the flexible members extend from and retract around the reels are taken into account by the data processor in this automatic initialization procedure.

A manual initialization procedure, which includes measurements with a tape measure, alternatively, may be employed.

Figure 6:
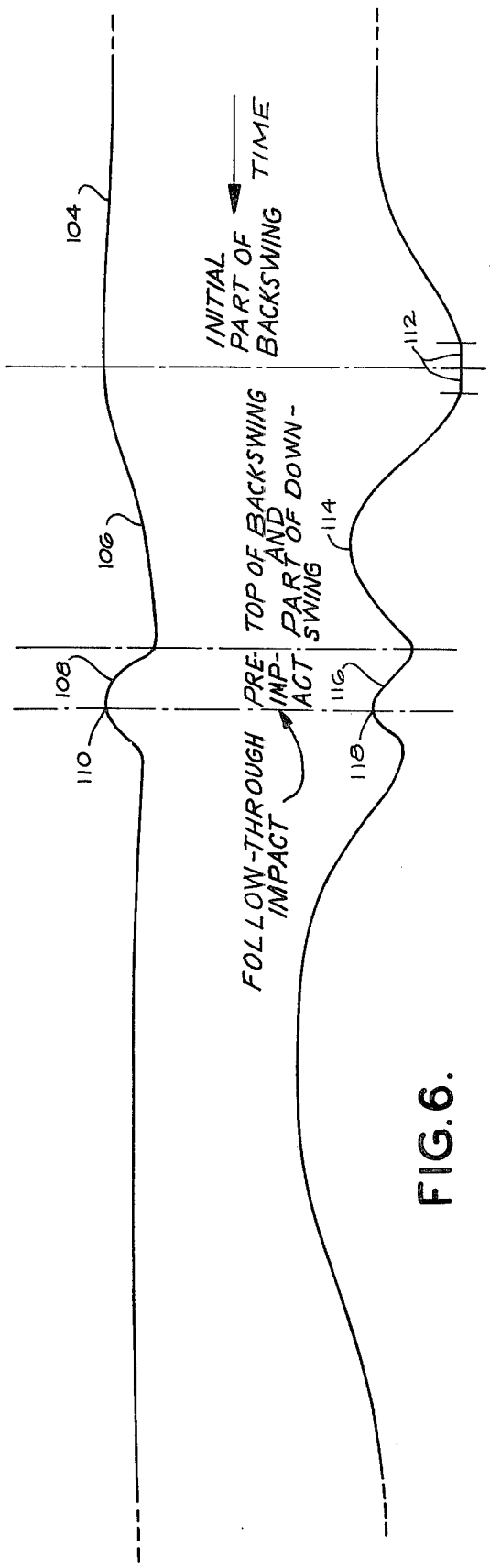
FIG. 6 is a drawing of recorder outputs which have been obtained from apparatus in accordance with FIG. 1.

FIG. 6 is a drawing of printed recorder outputs for Y (upper graph) and X' (lower graph) that were obtained for a single golf swing using apparatus in accordance with FIG. 1. Time increases from right to left on these graphs.

Along the graph of Y, one can see that the club is at the address position until approximately the point 104 at which Y begins to show a slight increase. Y then increases slightly before decreasing steadily along a portion 106 generally corresponding to the top of the back swing and part of the downswing. During the downswing, the decrease in Y terminates and a sharply increasing portion 108 follows and continues until the impact point 110. Following the hypothetical impact, Y decreases sharply and remains somewhat below the address level through the remainder of the follow-through.

With respect to the graph of X', one can see that as the swing started, the golfer immediately took the club associated position to the user side of the reference plane. (The flat portion 112 represents a limit of the system using the plus or minus 24 inch option for X', noted above.) A widely varying portion 114, including an increase, a maximum and decrease in X', generally corresponding to the top of the backswing and part of the downswing, tracks a looping of the club associated position from the user side of the plane to the opposite side of the plane and back. As the swing moved toward a hypothetical impact, the club associated position, along an increasing portion 116, moved toward the reference plane and at the impact point 118, intersected the plane. Immediately after the hypothetical impact, during the follow-through, the club associated position again dipped to the user side of the reference plane and returned to the opposite side of the plane.

It will, of course, be appreciated that the embodiment of the invention which has been described has been given by way of illustration, and that modifications in detail may be made without departing from the spirit of the invention.

What is claimed is:

1. Apparatus for analyzing the movement of a device to be manipulated by a user thereof, comprising:
    (a) a first flexible member attached at one end and at a first position to the device for extending and retracting in a taut manner with changes in distance, as measured along said member, between said first position and a second position through which said member passes;
    (b) means for extending additional lengths of said first member corresponding to increases in said distance and retracting excess lengths of said member corresponding to decreases in said distance;
    (c) a second flexible member attached at one end and at said first position to the device for extending and retracting in a taut manner with changes in distance, as measured along said member, between said first position and a third position through which said member passes;
    (d) means for extending additional lengths of said second member corresponding to increases in said distance and retracting excess lengths of said member corresponding to decreases in said distance; and
    (e) means for slidably holding said first member to a fourth position intermediate, as measured along said member, said first and second positions.

2. Movement-analyzing apparatus as defined in claim 1 wherein said holding means secures said first member to the user of the device.

3. Movement-analyzing apparatus as defined in claim 1 further comprising means for slidably holding said first and second members to a fifth position.

4. Movement-analyzing apparatus as defined in claim 3 further comprising means for adjustably varying said fifth position.

5. Movement-analyzing apparatus as defined in claim 3 wherein said fifth position is intermediate, as measured along said first member, said fourth and second positions and intermediate, as measured along said second member, said first and third positions.

6. Movement-analyzing apparatus as defined in claim 5 wherein the portions of said first member between said first and fourth positions and between said fourth and fifth positions and the portion of said second member between said first and fifth positions form a triangle having said portions of said first member between said fourth and fifth positions and between said first and fourth positions as its first and second legs, respectively, and said portion of said second member between said first and fifth positions as its third leg.

7. Movement-analyzing apparatus as defined in claim 6 wherein prior to the manipulation of the device, with the device oriented in an initial position, said first and second legs of said triangle are oriented perpendicularly to each other, whereby said first and second legs define a reference plane characterized in that said first leg is oriented perpendicularly to said plane and said second leg is oriented along said plane and whereby the following equation is satisfied:

$$C_O^2 = A_O^2 + B_O^2;$$

where
  $A_O$ = the length of said first leg,
  $B_O$ = the length of said second leg, and
  $C_O$ = the length of said third leg.

8. Movement-analyzing apparatus as defined in claim 7 wherein during at least part of the course of manipulation of the device the following equation is approximately satisfied:

$$X = (A_O^2 + B^2 - C^2)/2A_O;$$

where the magnitude of X equals the distance of said first position from said reference plane and X is positive if said first position is on one side of said plane and negative if said position is on the other side of said plane,
  B = the length of said second leg, and
  C = the length of said third leg.

9. Movement-analyzing apparatus as defined in claim 7 wherein during at least part of the course of manipulation of the device said fifth position remains stationary and said fourth position remains approximately stationary at the respective locations of said positions when the device is oriented in its said initial position, whereby during said part of the course of manipulation, the following equations are approximately satisfied:

$$X = (A_O^2 + B^2 - C^2)/2A_O,$$

and $$B - B_O = B - B_O + A - A_O;$$

where the magnitude of X equals the distance of said first position from said reference plane and X is positive if said first position is on one side of said plane and negative if said position is on the other side of said plane,
  A = the length of said first leg,
  B = the length of said second leg, and
  C = the length of said third leg.

10. Movement-analyzing apparatus as defined in claim 3 further comprising:
    (a) means for monitoring said extending of additional lengths and retracting of excess lengths of said first member; and
    (b) means for monitoring said extending of additional lengths and retracting of excess lengths of said second member.

11. Movement-analyzing apparatus as defined in claim 10 wherein said monitoring means for said first member provides a first electrical signal in response to said changes in distance between said first and second positions and said monitoring means for said second member provides a second electrical signal in response to said changes in distance between said first and third positions.

12. Movement-analyzing apparatus as defined in claim 11 further comprising electronic data processing means for generating an output electrical signal in response to said first and second electrical signals.

13. Movement-analyzing apparatus as defined in claim 12 wherein said output electrical signal corresponds to the solution for $X'$ in the following equation:

$$X' = [A_{O'}^2 + (B_{O'} + L_1 - L_{10})^2 - (C_{O'} + L_2 - L_{20})^2]/2A_{O'};$$

where
- $A_{O'}$ = an initial length of the portion of said first member between said fourth and fifth positions,
- $B_{O'}$ = an initial length of the portion of said first member between said first and fourth positions,
- $C_{O'}$ = an initial length of the portion of said second member between said first and fifth positions,
- $L_{10}$ = an initial length of the portion of said first member between said first and second positions,
- $L_{20}$ = an initial length of the portion of said second member between said first and third positions,
- $L_1$ = the length of the portion of said first member between said first and second positions, and
- $L_2$ = the length of the portion of said second member between said first and third positions.

14. Movement-analyzing apparatus as defined in claim 12 wherein said output electrical signal corresponds to the solution for Y in the following equation:

$$Y = L_1 - L_{10};$$

where
- $L_{10}$ = an initial length of the portion of said first member between said first and second positions, and
- $L_1$ = the length of the portion of said first member between said first and second positions.

15. Movement-analyzing apparatus as defined in claim 12 further comprising means for providing a visual display in response to said output electrical signal.

16. Movement-analyzing apparatus as defined in claim 15 wherein said means for providing a visual display displays responses to said changes in distance approximately simultaneously with the occurrence of said changes.

17. Movement-analyzing apparatus as defined in claim 15 wherein said means for providing a visual display comprises a recorder for printing a graphical display.

18. Movement-analyzing apparatus as defined in claim 11 further comprising electronic data processing means for generating output electrical signals in response to said first and second electrical signals.

19. Movement-analyzing apparatus as defined in claim 18 wherein said output electrical signals correspond to the solutions for $X'$ and Y in the following equations:

$$X' = [A_{O'}^2 + (B_O + L_1 - L_{10})^2 - (C_{O'} + L_2 + L_{20})^2]/2A_{O'},$$

and $$Y = L_1 - L_{10};$$

where
- $A_{O'}$ = an initial length of the portion of said first member between said fourth and fifth positions,
- $B_{O'}$ = an initial length of the portion of said first member between said first and fourth positions,
- $C_{O'}$ = an initial length of the portion of said second member between said first and fifth positions,
- $L_{10}$ = an initial length of the portion of said first member between said first and second positions,
- $L_{20}$ = an initial length of the portion of said second member between said first and third positions,
- $L_1$ = the length of the portion of said first member between said first and second positions, and
- $L_2$ = the length of the portion of said second member between said first and third positions.

20. Movement-analyzing apparatus as defined in claim 19 further comprising means for providing a visual display in response to said electrical output signals.

* * * * *

UNITED STATES PATENT AND TRADEMARK OFFICE
CERTIFICATE OF CORRECTION

PATENT NO. : 4,181,310
DATED : January 1, 1980
INVENTOR(S) : NOEL A. BOEHMER

It is certified that error appears in the above-identified patent and that said Letters Patent are hereby corrected as shown below:

Column 11, line 18: $\Delta(\Delta)_i$ should read $\Delta(\phantom{\Delta})_i$

Column 16, claim 19: equation in printed patent states $$X' = [A_o'^2 + (B_o + L_1 - L_{10})^2 - (C_o' + L_2 + L_{20})^2]/2A_o'$$

and should read as follows:

$$X' = [A_o'^2 + (B_o' + L_1 - L_{10})^2 - (C_o' + L_2 - L_{20})^2]/2A_o'$$

Signed and Sealed this

Twenty-fourth Day of June 1980

[SEAL]

Attest:

SIDNEY A. DIAMOND

Attesting Officer

Commissioner of Patents and Trademarks